S. I. Sherman,
Truss Pad.
Nº 16,292. Patented Dec. 23, 1856.
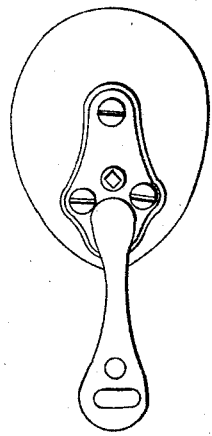
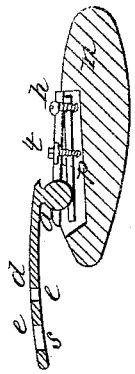
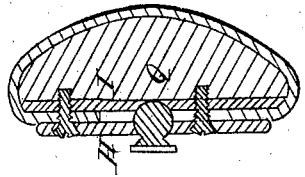
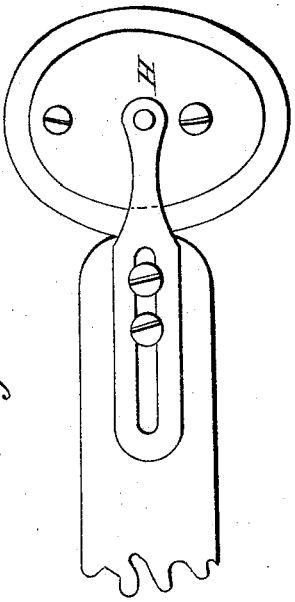
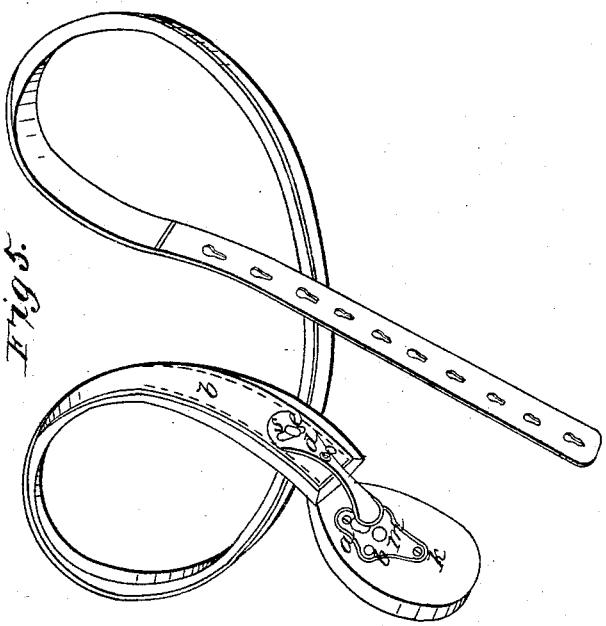

UNITED STATES PATENT OFFICE.

SYLVESTER I. SHERMAN, OF NEW YORK, N. Y.

TRUSS-PAD.

Specification of Letters Patent No. 16,292, dated December 23, 1856.

*To all whom it may concern:*

Be it known that I, SYLVESTER I. SHERMAN, of New York, in the county of New York and State of New York, have invented certain new and useful Improvements in Truss-Pads; and I hereby declare the following is a full, clear, and exact description thereof, reference being had to the accompanying drawing, in which—

Figure 1, is an elevation and Fig. 2 a section through A B of my improved truss pad. Figs. 3 and 4 show an elevation and section through C D of a truss pad made on the same principle; finally Fig. 5, a perspective view.

My invention consists in an improvement of trusspads whereby the pads can be adjusted and set to any required position with great facility.

I use a peculiar joint for connecting the pad with the body spring, consisting of a spherical ball pressed between two metallic plates in such a manner that the pressure may be increased or decreased for the purpose of adjusting and securing the proper position of the pad in relation to the spring and the part of the body to which it is applied, by increasing or decreasing the friction of the ball between its plates. A ball and socket joint has been heretofore essayed for such purpose, but under an entire misapprehension of the nature of hernia and it would be easy to demonstrate a ball and socket joint so used as to be a positive evil.

It is very important to be able to adjust and set a pad to the most comfortable or any required position of the parts, but when set the pad should yield no more than is permitted by the body spring of the truss.

A spherical ball G is firmly attached to the slotted strap, and is placed between two metallic plates H and I. The upper plate H is furnished with 3 holes, one central and of a diameter smaller than the diameter of the sphere, so as to prevent the ball from being drawn through it; the other 2 holes are placed at unequal distances from the center hole, for the purpose of giving a more powerful leverage to the screw that performs the compression of the plate. The plate I has corresponding holes, the central one is a rough and spherical shaped cavity. One of the screws is holding the two plates together while the other will draw them together until the required degree of resistance is obtained. I also use another arrangement on the same principle and $a$ in Figs. 3, 4 and 5 shows the spherical ball, by which the pad is attached to the body spring $b$. The ball is at one end of a short arm or piece $c$, the other end of which is secured to the body spring by the pivot screws $d$ and the screw $e$ passing through the slot in the usual manner for adjusting the height of the pad.

Firmly fixed to the pad is a strip of metal $n$ to which another strip $m$ is hinged as $h$. The ball $a$ plays within an opening in strip $m$ and between the strips $m$ and $n$ and when the two strips are pressed firmly by the set screw $t$ or other means, the ball is held fast and the joint becomes rigid. The set screw $t$ is provided with a square head to fit a suitable wrench or key like a clockkey. When the pad is to be fitted the set screw is loosened and the pad having a universal motion is fixed to the most desirable position and then firmly secured by tightening the set screw. The strips $n$ and $m$ with the set screw make as if it were a device for confining the universal joint in any position.

Having thus fully described my invention I wish it to be understood that I do not claim setting truss pads to a given position nor do I claim a ball and socket joint, but

I do claim—

Rendering the joint of truss pads rigid in any desired position by compressing the ball between two plates in the manner described.

In testimony whereof I have signed my name to this specification before two subscribing witnesses.

S. I. SHERMAN.

Witnesses:
 A. POLLAK,
 CHAS. EVERETT.